US007474306B2

(12) United States Patent
Doi et al.

(10) Patent No.: US 7,474,306 B2

(45) **Date of Patent: *Jan. 6, 2009**

(54) DISPLAY PANEL INCLUDING A PLURALITY OF DRIVERS HAVING COMMON WIRES EACH FOR PROVIDING REFERENCE VOLTAGE

(75) Inventors: Yasuyuki Doi, Nagaokakyo (JP); Tetsuro Oomori, Hirakata (JP); Kazuyoshi Nishi, Muko (JP)

(73) Assignee: Panasonic Corporation, Osaka (JP)

( * ) Notice: Subject to any disclaimer, the term of this patent is extended or adjusted under 35 U.S.C. 154(b) by 477 days.

This patent is subject to a terminal disclaimer.

(21) Appl. No.: 11/252,583

(22) Filed: Oct. 19, 2005

(65) Prior Publication Data

US 2006/0038763 A1 Feb. 23, 2006

Related U.S. Application Data

(63) Continuation of application No. 10/019,437, filed as application No. PCT/JP00/05904 on Aug. 31, 2000, now Pat. No. 6,982,706.

(30) Foreign Application Priority Data

Dec. 16, 1999 (JP) ................................ 11-356898

(51) Int. Cl.

*G06F 3/038* (2006.01)
*G09G 5/00* (2006.01)
*G09G 3/36* (2006.01)

(52) U.S. Cl. ......................... 345/206; 345/204; 345/87; 345/55

(58) Field of Classification Search ................... 345/87, 345/204, 206, 214, 55, 519

See application file for complete search history.

(56) References Cited

U.S. PATENT DOCUMENTS 5,250,937 A 10/1993 Kikuo et al.

(Continued)

FOREIGN PATENT DOCUMENTS

JP 59-154808 9/1984

(Continued)

OTHER PUBLICATIONS

Japanese Office Action issued in corresponding Japanese Patent Application No. 11-356898, dated Apr. 10, 2007.

*Primary Examiner*—Bipin Shalwala
*Assistant Examiner*—Steven E Holton
(74) *Attorney, Agent, or Firm*—McDermott Will & Emery LLP

(57) ABSTRACT

A source driver 4A arranged on a liquid crystal panel includes therein in-chip reference voltage wires 17 extending from one end to the other end of an LSI chip. The source driver 4A includes therein: branch reference voltage wires 17*a* branching off from in-chip reference voltage wires 17; reference voltage production buffers 31; a control circuit 30 for controlling the reference voltage production buffers 31; a reference voltage production resistor section 32 for subdividing the reference voltage into values of n steps; voltage level selection circuits 34 each for selecting one of the subdivided voltages; and output buffers 35. Since the reference voltages are supplied to each source driver 4 via wiring for connecting the in-chip reference voltage wires 17 in series with one another, the wiring structure for supplying the reference voltages can be simplified.

8 Claims, 11 Drawing Sheets

U.S. PATENT DOCUMENTS

| | | | |
|---|---|---|---|
| 5,414,443 | A | 5/1995 | Kanatani et al. |
| 5,670,994 | A | 9/1997 | Kawaguchi et al. |
| 5,729,316 | A | 3/1998 | Yamamura |
| 5,748,175 | A | 5/1998 | Shimada et al. |
| 5,751,279 | A | 5/1998 | Okumura |
| 5,754,150 | A | 5/1998 | Matsui |
| 5,801,673 | A | 9/1998 | Shimada et al. |
| 6,002,384 | A | 12/1999 | Tamai et al. |
| 6,211,849 | B1 | 4/2001 | Sasaki et al. |
| 6,452,590 | B1 | 9/2002 | Awamoto et al. |
| 6,600,470 | B1 | 7/2003 | Tsuda |
| 2001/0013850 | A1 | 8/2001 | Sakaguchi et al. |
| 2001/0043176 | A1 | 11/2001 | Park |
| 2002/0070928 | A1 | 6/2002 | Awamoto et al. |

FOREIGN PATENT DOCUMENTS

| | | |
|---|---|---|
| JP | 62-154909 | 7/1987 |
| JP | 63-045918 | 2/1988 |
| JP | 03-165118 | 7/1991 |
| JP | 04-086787 | 3/1992 |
| JP | 05-035220 | 2/1993 |
| JP | 05-094159 | 4/1993 |
| JP | 05-204339 | 8/1993 |
| JP | 05-273520 | 10/1993 |
| JP | 07-191635 | 7/1995 |
| JP | 8-87251 | 4/1996 |
| JP | 09-044100 | 2/1997 |
| JP | 09-244590 | 9/1997 |
| JP | 2000-235376 | 8/2000 |
| JP | 2001-174843 | 6/2001 |

DISPLAY PANEL INCLUDING A PLURALITY OF DRIVERS HAVING COMMON WIRES EACH FOR PROVIDING REFERENCE VOLTAGE

RELATED APPLICATION

This application is a continuation of U.S. application Ser. No. 10/019,437 filed on Dec. 31, 2001, which is the U.S. National Phase under 35 U.S.C. § 371 of International Application No. PCT/JP00/05904 filed Aug. 31, 2000 now U.S. Pat. No. 6,982,706.

TECHNICAL FIELD

The present invention relates to a liquid crystal driving circuit for driving a liquid crystal element, a semiconductor chip arranged in the liquid crystal driving circuit, and a reference voltage buffering circuit formed in the semiconductor chip.

BACKGROUND ART

A liquid crystal panel, and a liquid crystal module obtained by adding a driving circuit to the liquid crystal panel, are known in the prior art, in which the liquid crystal panel includes a liquid crystal material interposed between a pair of glass substrates opposing each other, and is capable of displaying various types of visual information such as patterns, characters and symbols by utilizing the nature of the liquid crystal material of changing the light transmittance thereof according to the orientation thereof in response to a voltage applied between the pair of glass substrates.

FIG. 9 is a plan view illustrating a conventional liquid crystal module 100. As illustrated in the figure, the liquid crystal module 100 can be divided into a liquid crystal panel 101 and a driving circuit for driving liquid crystal elements 102 in a liquid crystal display section 101*a* of the liquid crystal panel 101. A pair of glass substrates interposing a liquid crystal material therebetween are provided in the liquid crystal display section 101*a* of the liquid crystal panel 101. The liquid crystal elements 102 and TFTs 103 are arranged in a matrix pattern between one of the glass substrates (the upper glass substrate), which is shown in FIG. 9, and the counter glass substrate (the lower glass substrate), which is not shown in FIG. 9. Each liquid crystal element 102 includes a liquid crystal material interposed between a transparent electrode formed on the lower surface of the upper glass substrate and a counter transparent electrode formed on the upper surface of the counter glass substrate, for example. Moreover, each TFT 103 is a transistor connected to the transparent electrode on the lower surface of the upper glass substrate for controlling the voltage of the transparent electrode.

Moreover, the driving circuit includes: a plurality of (eight in this example) source drivers 104 for controlling the respective source voltages of the TFTs 103; gate drivers 105 for controlling the respective gate voltages of the TFTs 103; a voltage production/control circuit 120 for producing voltage signals and control signals to be supplied to the source drivers 104 and the gate drivers 105; a first wiring substrate 110 provided between the voltage production/control circuit 120 and the source drivers 104; and a second wiring substrate 112 provided between the voltage production/control circuit 120 and the gate drivers 105. The first wiring substrate 110 and the source drivers 104 are connected to each other via flexible wires 111, and the second wiring substrate 112 and the gate drivers 105 are connected to each other via flexible wires 113. The source drivers 104 and the gate drivers 105 of the driving circuit are arranged in the liquid crystal panel 101 excluding the liquid crystal display section 101*a*, thus forming a so-called COG (Chip On Glass) type structure. The source drivers 104 are individually formed respectively on eight LSI chips, for example.

In the liquid crystal panel 101, a large number of data lines 106 extend from the source drivers 104 of the driving circuit along columns shown in FIG. 9 into the liquid crystal display section 111*a*, and the data lines 106 are connected to the respective sources of the TFTs 103. Moreover, a large number of gate lines 107 extend from the gate drivers 105 along rows shown in FIG. 9 into the liquid crystal display section 101*a*, and the gate lines 107 are connected to the respective gates of the TFTs 103. The modes in which the voltage to be applied across the liquid crystal element 102 is controlled include, with the voltage polarity when the transparent electrode is at a higher potential than the counter transparent electrode being defined as "positive": a mode of a first type in which the voltage of the TFT-side transparent electrode is controlled to voltage values in n steps (64 steps in this example) while switching the voltage of the counter transparent electrode to be positive and negative at regular time intervals; and a mode of a second type in which the voltage of the TFT-side transparent electrode is alternately inverted to voltage values in n steps in the positive and negative directions (64 steps each, or 128 steps in total, in this example) at regular time intervals while maintaining the voltage of the counter transparent electrode at a constant level (e.g., the intermediate potential of VDD/2). Both modes are designed so that an error in brightness due to deterioration of the liquid crystal material can be avoided as long as the voltage applied across the liquid crystal element 102 is always of the same polarity.

FIG. 10 is a block circuit diagram schematically illustrating the structure of a conventional source driver 104A of the first type. As illustrated in the figure, the source driver 104A includes therein: pads 133 to which reference voltage wires 131 are mechanically connected; a reference voltage production resistor section 132 for receiving signals from the reference voltage wires 131 to produce subdivided reference voltages; a large number of voltage level selection circuits 134 connected to the reference voltage production resistor section 132; and output buffers 135 arranged on the subsequent-stage side of the respective voltage level selection circuits 134. Thus, voltage-related signals are produced in the source driver 104A as much as possible, with only the reference voltage being externally produced.

The reference voltage wires 131 are wires connecting the voltage production/control circuit 120 to the source driver 104A, some of the reference voltage wires 131 being the flexible wires 111. Note that other than the reference voltage wires, data signal lines (e.g., 6 bits) are also connected to the source driver 104A, and the first wiring substrate 110 has a structure including a number of substrate layers stacked together for supporting the very large number of wires.

The reference voltage production resistor section 132 controls the orientation of one liquid crystal element 102 in n steps (e.g., 64 steps) so as to give n steps (e.g., 64 steps) of brightness. For example, ten reference voltage wires 131 carrying therethrough signals of ten steps of voltage values different from one another are connected to the reference voltage production resistor section 132 so that the ten steps of voltage values are further subdivided into 64 steps of voltage values by the reference voltage production resistor section 132. Moreover, the first wiring substrate 110 described above is for supporting the reference voltage wires 131, etc.

Each voltage level selection circuit 134 receives a voltage signal from the reference voltage production resistor section 132 via n signal lines, and the voltage level selection circuit 134 allows a voltage signal supplied from one of the n signal lines passes therethrough under the control of a voltage selection control signal Svs so that the voltage signal is output to the data line 106 via the output buffer 135. Thus, the voltage to be applied, via the TFT 103, between the pair of transparent electrodes interposing the liquid crystal element 102 therebetween is controlled to be one of 64 steps by using the voltage selection control signal Svs, thereby controlling the brightness of light passing through the liquid crystal element 102. Moreover, for example, 384 voltage level selection circuits 134 are provided in each source driver 104A in a case of a color display.

Moreover, FIG. 11 is a block circuit diagram schematically illustrating the structure of a conventional source driver 104B of the second type. As illustrated in the figure, the source driver 104B includes therein: a positive-side reference voltage production resistor section 132*a* for receiving a reference voltage whose potential is higher than that of the intermediate voltage applied to the counter transparent electrode; and a negative-side reference voltage production resistor section 132*b* for receiving a reference voltage whose potential is lower than that of the intermediate voltage applied to the counter transparent electrode. Each voltage level selection circuit 134 can be divided into a positive-side voltage level selection circuit 134*a* for receiving the output from the positive-side reference voltage production resistor section 132*a*, and a negative-side voltage level selection circuit 134*b* for receiving the output from the negative-side reference voltage production resistor section 132*b*. The positive-side voltage level selection circuits 134*a* and the negative-side voltage level selection circuits 134*b* are arranged alternately. The output from the positive-side voltage level selection circuits 134*a* and the output from the negative-side voltage level selection circuits 134*b* are alternately switched to one another so as to be supplied to the output buffers 135, 135 provided on the output side thereof, by a selector 136 receiving the outputs from the positive-side voltage level selection circuit 134*a* and the negative-side voltage level selection circuit 134*b* according to a selector control signal Sse. Thus, voltage signals that are alternately switched between a high level and a low level at regular time intervals are output from the two output buffers 135, 135 adjacent to each other. Specifically, voltages of the opposite polarities are always applied across the liquid crystal elements 102 connected to the adjacent data lines 106, with the polarities being inverted at regular time intervals. Thus, the source driver 104B provided in a liquid crystal module of the second type switches the voltages of the adjacent data lines 106 between the high level and the low level so that the voltage applied across each liquid crystal element 102 is switched between a positive value and a negative value at regular time intervals.

PROBLEMS TO BE SOLVED BY THE INVENTION

For either the first type or the second type as described above, it is required that there are little variations in the voltage value of the reference voltage to be supplied to the source driver 104. This is because when a voltage on the order of one volt is subdivided into 64 gray scales or 256 gray scales, for example, the voltage interval after the subdivision will be about 10 to 20 mV. Due to such a requirement, the first wiring substrate 110 and the source drivers 104 are connected to each other by the flexible wires 111 whose resistance is on the order of 1 so as to supply the reference voltage produced by the voltage production/control circuit 120 with as little voltage drop as possible.

However, a problem common to the conventional liquid crystal modules of the first and second types is the complexity in the structure of the reference voltage wiring for supplying reference voltages to the source drivers. Particularly, along with the developments, in image display systems for computer graphics, etc., there has been an increasing demand for subdividing the voltage signals supplied from the source drivers, and it is expected that the number of wires will further increase. Therefore, in the structure illustrated in FIG. 9, the first wiring substrate 110, which is connected to the source drivers 104 via the flexible wires 111, has had a complicated structure including a large number of substrate layers stacked together, presenting a factor that inhibits a reduction in the total cost of a liquid crystal module.

An object of the present invention is to realize a reduction in the size and/or the total cost of a liquid crystal module by taking measures for simplifying the structure of the wiring for supplying reference voltages while suppressing the variations in the voltage value of the reference voltages to be supplied to the source drivers.

DISCLOSURE OF THE INVENTION

A liquid crystal driving circuit of the present invention is a liquid crystal driving circuit in which a plurality of source drivers for driving a liquid crystal element are arranged on a liquid crystal panel, the liquid crystal driving circuit including: a reference voltage production circuit for producing a plurality of reference voltages for driving the liquid crystal element; and a plurality of reference voltage wires for supplying the plurality of reference voltages, produced by the reference voltage production circuit, to the source driver circuit devices, respectively, the reference voltage wires extending through an area on the liquid crystal panel and an area on each of the source driver circuit devices.

In this way, reference voltages, which in the prior art are supplied to the source driver circuits via wire members such as flexible wires, are supplied via reference voltage wires provided on the liquid crystal panel, whereby it is possible to simplify the structure of a wiring substrate, which in the prior art is provided for the reference voltage wires, etc. Therefore, it is possible to realize a reduction in the size and the total cost of a liquid crystal display device by, for example, reducing the number of wiring substrate layers to be stacked together.

It is preferred that the source driver circuit device includes: a plurality of in-chip reference voltage wires extending from one end to the other end of the source driver circuit device for supplying a plurality of reference voltages different from one another; the same number of branch reference voltage wires branching off from the plurality of in-chip reference voltage wires, respectively; the same number of buffers for receiving and then outputting reference voltages supplied from the plurality of branch reference voltage wires, respectively; and a selection circuit for selecting, as a voltage for driving the liquid crystal element, one of the reference voltages supplied from the plurality of buffers.

When the reference voltage wires are provided on the liquid crystal panel, a voltage drop may occur in the reference voltages input to the source driver circuits as a current flows through a reference voltage wire, due to an increase in the resistance value of the reference voltage wire between chips, etc. In contrast, when a buffer is provided on the preceding-stage side of the selection circuit, a current having passed through a buffer does not flow through a reference voltage wire that is connected to the selection circuit, whereby it is possible to supply an appropriate driving voltage to each liquid crystal element.

A semiconductor integrated circuit device of the present invention is a semiconductor integrated circuit device provided in a liquid crystal module and carrying thereon a source driver circuit for driving a liquid crystal element, wherein the source driver circuit includes: a plurality of in-chip reference voltage wires extending from one end to the other end of the semiconductor integrated circuit device for supplying a plurality of reference voltages different from one another; the same number of branch reference voltage wires branching off from the plurality of in-chip reference voltage wires, respectively; the same number of buffers for receiving and then outputting reference voltages supplied from the plurality of branch reference voltage wires, respectively; and a selection circuit for selecting, as a voltage for driving the liquid crystal element, one of the reference voltages supplied from the plurality of buffers.

In this way, it is possible to provide a semiconductor integrated circuit device made of a semiconductor chip that can be used for providing a liquid crystal driving circuit as described above in which reference voltage wires are provided on a panel.

It is possible to obtain a semiconductor integrated circuit device suitable for a liquid crystal panel for displaying images of an increased definition by employing a structure where the semiconductor integrated circuit device further includes a subdivided voltage production circuit for receiving an output voltage from each of the buffers so as to produce subdivided voltages obtained by subdividing the plurality of reference voltages, and then outputting the subdivided voltages to the selection circuit, wherein the selection circuit selects one of the subdivided voltages.

When the buffer has an offset canceling function for reducing a potential difference between an input voltage and an output voltage, it is possible to supply a high precision reference voltage with little variations.

The buffer may include: an operator for receiving an input voltage to the buffer at one terminal and an output voltage of the operator itself at the other terminal, and operating so that the output voltage is equal to the input voltage; a capacitor including a first electrode and a second electrode for storing a charge corresponding to a voltage difference between the input voltage and the output voltage; an input-side node for introducing the input voltage to the operator; a first node connected to the first electrode of the capacitor; a second node connected to the second electrode of the capacitor; a third node for receiving the output voltage from the operator; a first switching element provided between the second node and the third node; a second switching element provided between the first node and a node on an input side of the operator; and a third switching element provided between the first node and the third node.

It is possible to output more stable reference voltages by further including a closed circuit added to the second node, the closed circuit including therein a fifth switching element for compensating for an electric change in the second node due to switching of the first switching element.

It is preferred that the buffer includes two buffering circuits arranged in parallel to each other between an input-side node for receiving an externally produced reference voltage as the input voltage and an output-side node for sending out the output voltage; and each of the buffering circuits includes: an operator for receiving the input voltage at one terminal and an output voltage of the operator itself at the other terminal, and operating so that the output voltage is equal to the input voltage; a capacitor including a first electrode and a second electrode for storing a charge corresponding to a voltage difference between the input voltage and the output voltage; a first node connected to the first electrode of the capacitor; a second node connected to the second electrode of the capacitor; a third node for receiving an output signal from the operator; a first switching element provided between the second node and the third node; a second switching element provided between the first node and the input-side node; a third switching element provided between the first node and the output-side node; and a fourth switching element provided between the third node and the output-side node.

In this way, while a capacitor is storing a charge corresponding to an offset voltage in one of the buffering circuits, the buffering circuit can be electrically cut off from an output-side node, with an offset-canceled reference voltage being output from the other buffering circuit to the output-side node. Then, it is possible to always output an offset-canceled reference voltage by alternately reversing the state, and to reduce the inactive period during which the output needs to be stopped.

A reference voltage buffering circuit of the present invention is a reference voltage buffering circuit provided in a source driver circuit for driving a liquid crystal element of a liquid crystal module, wherein: the reference voltage buffering circuit includes two buffering circuits arranged in parallel to each other between an input-side node for receiving an externally produced reference voltage as an input voltage and an output-side node for sending out an output voltage; and each of the two buffering circuits includes: an operator for receiving the input voltage at one terminal and an output voltage of the operator itself at the other terminal, and operating so that the output voltage is equal to the input voltage; a capacitor including a first electrode and a second electrode for storing a charge corresponding to a voltage difference between the input voltage and the output voltage; a first node connected to the first electrode of the capacitor; a second node connected to the second electrode of the capacitor; a third node for receiving an output signal from the operator; a first switching element provided between the second node and the third node; a second switching element provided between the first node and the input side of the operator; a third switching element provided between the first node and the output-side node; and a fourth switching element provided between the third node and the output-side node.

In this way, while a capacitor is storing a charge corresponding to an offset voltage in one of the buffering circuits, the buffering circuit can be electrically cut off from an output-side node, with an offset-canceled reference voltage being output from the other buffering circuit to the output-side node. Then, it is possible to always output an offset-canceled reference voltage by alternately reversing the state.

The reference voltage buffering circuit may further include a closed circuit added to the second node, the closed circuit including therein a fifth switching element for compensating for an electric change in the second node due to switching of the first switching element. In this way, it is possible to compensate for the variations in the voltage at the second node by canceling the parasitic capacitance of the second switching element, thereby stabilizing the output voltage from the operator.

A method for controlling a reference voltage buffering circuit of the present invention is a method for controlling a reference voltage buffering circuit, including two buffering circuits arranged in parallel to each other, each of the buffering circuits including: an operator provided between an input-side node and an output-side node for operating so that an output voltage is equal to an input voltage; a capacitor including a first electrode and a second electrode; a first node connected to the first electrode of the capacitor; a second node connected to the second electrode of the capacitor; a third node for receiving an output signal from the operator; a first switching element provided between the second node and the third node; a second switching element provided between the first node and the input side of the operator; a third switching element provided between the first node and the output-side node; and a fourth switching element provided between the third node and the output-side node, wherein: in each of the buffering circuits, in an output mode in which a reference voltage is output from the buffering circuit, the third and fourth switching elements are placed in a conductive state while the first and second switching elements are placed in a non-conductive state; and in a charge storing mode in which the capacitor of the buffering circuit stores a charge, the third and fourth switching elements are placed in a non-conductive state while the first and second switching elements are placed in a conductive state.

With this method, while a capacitor is storing a charge corresponding to an offset voltage in one of the buffering circuits, the buffering circuit can be electrically cut off from an output-side node, with an offset-canceled reference voltage being output from the other buffering circuit to the output-side node. Then, it is possible to always output an offset-canceled reference voltage by alternately reversing the state, and to reduce the inactive period during which the output needs to be stopped.

The reference voltage buffering circuit may further include a closed circuit added to the second node, the closed circuit including therein a fifth switching element for canceling out an electric change in the second node due to switching of the first switching element; and when the first switching element is switched between a conductive state and a non-conductive state from one to another, the fifth switching element may be switched reversely in an interlocking manner. In this way, it is possible to output a stable reference voltage from the operator as described above.

When switching from a state where one of the two buffering circuits is in the output mode while the other buffering circuit is in the charge storing mode to another state where the one buffering circuit is in the charge storing mode while the other buffering circuit is in the output mode, the third and fourth switching elements of the other buffering circuit may be switched to a conductive state after the third and fourth switching elements of the one buffering circuit are switched to a non-conductive state. In this way, it is possible to reliably prevent an offset reference voltage from being output to the output-side node also when switching a control mode to another.

When the third and fourth switching elements of the one buffering circuit are switched to a non-conductive state, the third switching element may be switched to a non-conductive state after the fourth switching element is switched to a non-conductive state. When the third and fourth switching elements of the other buffering circuit are switched to a conductive state, the fourth switching element may be switched to a conductive state after the third switching element is switched to a conductive state.

BEST MODE FOR CARRYING OUT THE INVENTION

First Embodiment

Figure 1:
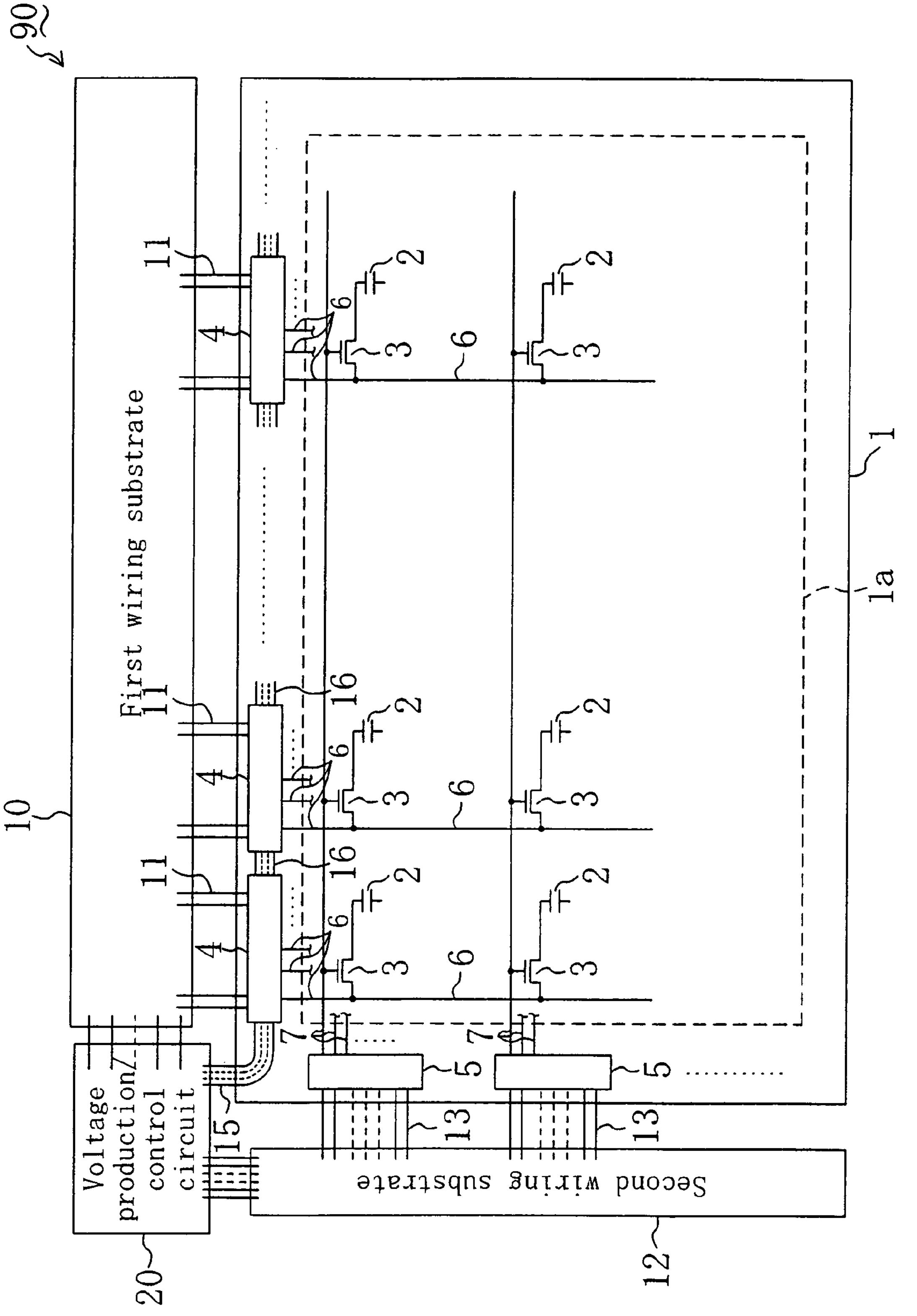
FIG. 1 is a plan view of a liquid crystal module used in each embodiment of the present invention.

FIG. 1 is a plan view of a liquid crystal module 90 used in each embodiment of the present invention. As illustrated in the figure, the liquid crystal module 90 used in the each embodiment of the present invention can be divided into a liquid crystal panel 1 and a driving circuit for driving liquid crystal elements 2 in a liquid crystal display section 1*a* of the liquid crystal panel 1. A pair of glass substrates interposing a liquid crystal material therebetween are provided in the liquid crystal display section 1*a* of the liquid crystal panel 1. The liquid crystal elements 2 and TFTs 3 are arranged in a matrix pattern between one of the glass substrates (the upper glass substrate), which is shown in FIG. 1, and the counter glass substrate (the lower glass substrate), which is not shown in FIG. 1. Each liquid crystal element 2 includes a liquid crystal material interposed between a transparent electrode formed on the lower surface of the upper glass substrate and a counter transparent electrode formed on the upper surface of the counter glass substrate, for example. Moreover, each TFT 3 is a transistor connected to the transparent electrode on the lower surface of the upper glass substrate for controlling the voltage of the transparent electrode. Moreover, although not shown in FIG. 1, a color filter, the lower glass substrate, the counter transparent electrode, a polarization filter, etc., are provided, with a light illumination section, and the like, being provided underneath. The pair of glass substrates, the liquid crystal material, the transparent electrodes, the TFTs, the color filter, the polarization filter, etc., together form the liquid crystal panel 1.

Moreover, the driving circuit includes: a plurality of (eight in this example) source drivers 4 for controlling the respective source voltages of the TFTs 3; gate drivers 5 for controlling the respective gate voltages of the TFTs 3; and a voltage production/control circuit 20 for producing voltage signals and control signals to be supplied to the source drivers 4 and the gate drivers 5. Moreover, the liquid crystal module 90 includes: a first wiring substrate 10 provided between the voltage production/control circuit 20 and the source drivers 4; and a second wiring substrate 12 provided between the voltage production/control circuit 20 and the gate drivers 5. The first wiring substrate 10 and the source drivers 4 are connected to each other via flexible wires 11, and the second wiring substrate 12 and the gate drivers 5 are connected to each other via flexible wires 13. The source drivers 4 and the gate drivers 5 of the driving circuit are arranged on the glass substrate of the liquid crystal panel 1, thus forming a so-called COG (Chip On Glass) type structure. The source drivers 4 are individually formed respectively on eight LSI chips, for example.

In the liquid crystal panel 1, a large number of data lines 6 extend from the source drivers 4 of the driving circuit along columns shown in FIG. 1 into the liquid crystal display section 1*a*, and the data lines 6 are connected to the respective sources of the TFTs 3. Moreover, a large number of gate lines 7 extend from the gate drivers 5 along rows shown in FIG. 1 into the liquid crystal display section 1*a*, and the gate lines 7 are connected to the respective gates of the TFTs 3.

A feature of the present embodiment is that the reference voltage wires are not included in the flexible wires 11, but are provided separately as lead-side reference voltage wires 15 between the voltage production/control circuit 20 and one source driver 4, in combination with inter-chip reference voltage wires 16 (on-panel reference voltage wires) provided between the source drivers 4 and each made of a conductive line whose resistance value is on the order of 100, and further with a plurality of (ten in the present embodiment) in-chip reference voltage wires that are formed in each source driver 4 so as to form a single continuous wiring structure together with the inter-chip reference voltage wires 16. The flexible wires 11 only include data supply wires, wires for supplying signals for controlling circuits in the source drivers 4, wires for supplying voltages for driving transistors of the circuits, etc.

Figure 2:
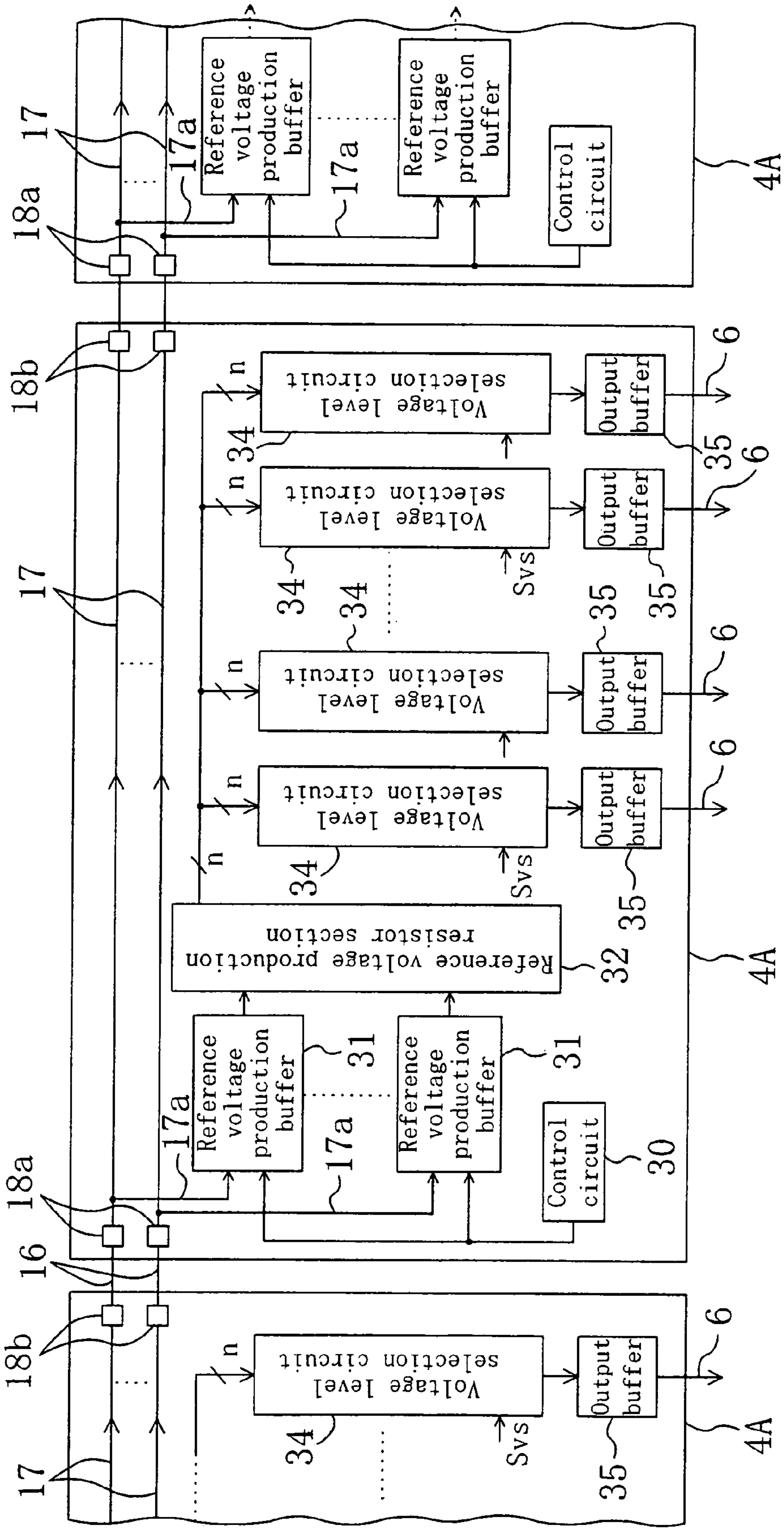
FIG. 2 is a block circuit diagram schematically illustrating the structure of a source driver of a first type according to a first embodiment.

FIG. 2 is a block circuit diagram schematically illustrating the structure of a source driver 4A of the first type according to the first embodiment. As illustrated in the figure, in the source driver 4A, which is made of an LSI chip, ten in-chip reference voltage wires 17 each made of a conductive line whose resistance value ranges from values on the order of 1 to values on the order of 100 are formed to extend from one end to the other end of the LSI chip. At both ends of each in-chip reference voltage wire 17, an input-side pad 18*a* and an output-side pad 18*b* are provided for mechanical connection of the inter-chip reference voltage wire 16. Moreover, in the source driver 4A, a branch reference voltage wire 17*a* is provided branching off from each in-chip reference voltage wire 17. The source driver 4A includes: the same number of reference voltage production buffers 31 as the branch reference voltage wires 17*a*; a control circuit 30 for controlling the reference voltage production buffers 31; a reference voltage production resistor section 32 for receiving signals from the reference voltage production buffers 31 to subdivide the reference voltage into values of n steps (e.g., 64 steps); a large number of voltage level selection circuits 34 connected to the reference voltage production resistor section 32; and output buffers 35 arranged on the subsequent-stage side of the respective voltage level selection circuits 34.

Each voltage level selection circuit 34 receives a voltage signal from the reference voltage production resistor section 32 via n signal lines, and the voltage level selection circuit 34 allows a voltage signal supplied from one of the n signal lines passes therethrough under the control of a voltage selection control signal Svs so that the voltage signal is output to the data line 6 via the output buffer 35. Thus, the voltage to be applied, via the TFT 03, between the pair of transparent electrodes interposing the liquid crystal element 2 therebetween is controlled to be one of 64 steps by using the voltage selection control signal Svs, thereby controlling the brightness of light passing through the liquid crystal element 2. Moreover, for example, 384 voltage level selection circuits 34 are provided in each source driver 4A in a case of a color display.

Figure 3:
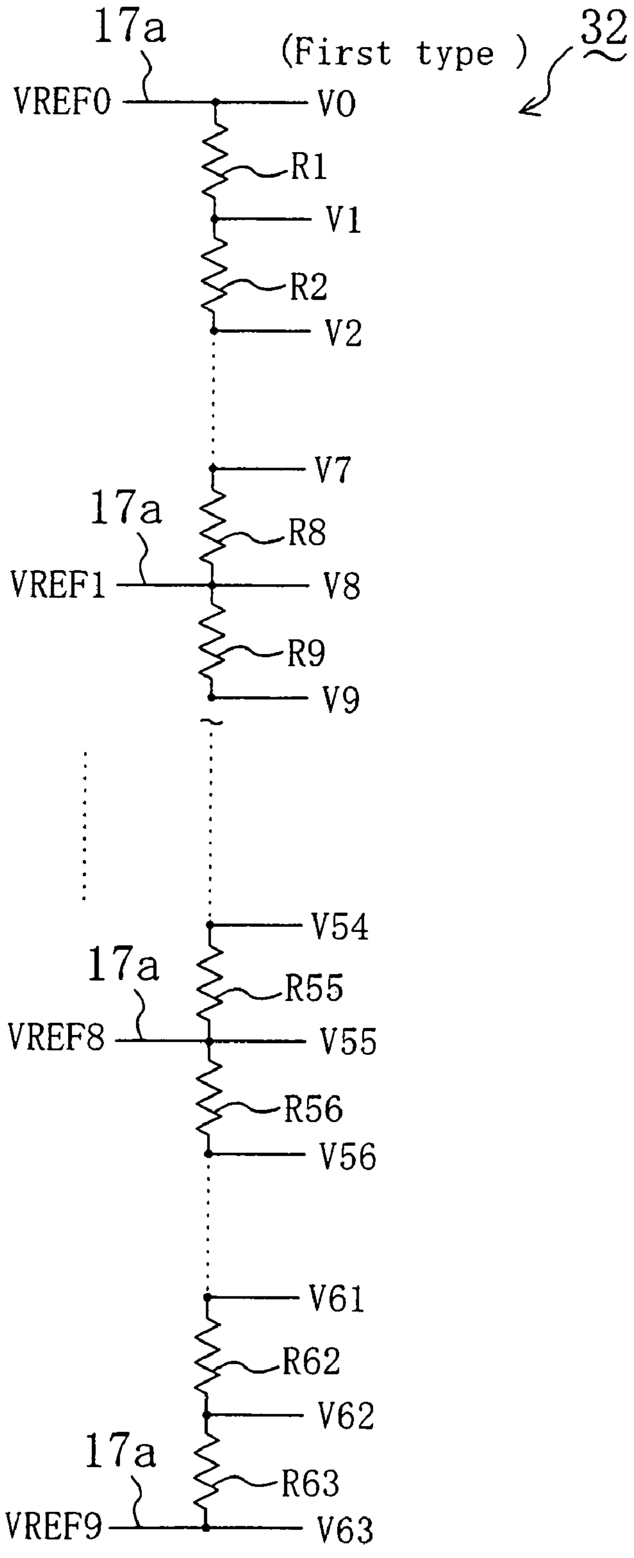
FIG. 3 is an electric circuit diagram illustrating the structure of a reference voltage production resistor section of the source driver of the first type according to the first embodiment.

FIG. 3 is an electric circuit diagram illustrating the structure of the reference voltage production resistor section 32. As illustrated in the figure, the reference voltage production resistor section 32 includes (n−1) (63 in this example) resistors R1 to R63 connected together in series. It is designed so as to receive reference voltages VREF0 to VREF9, subdivided in ten steps, from the respective branch reference voltage wires 17*a*, and then output voltage signals V0 to V63, subdivided in 64 steps, from the nodes between the resistors R1 to R63.

Figure 9:
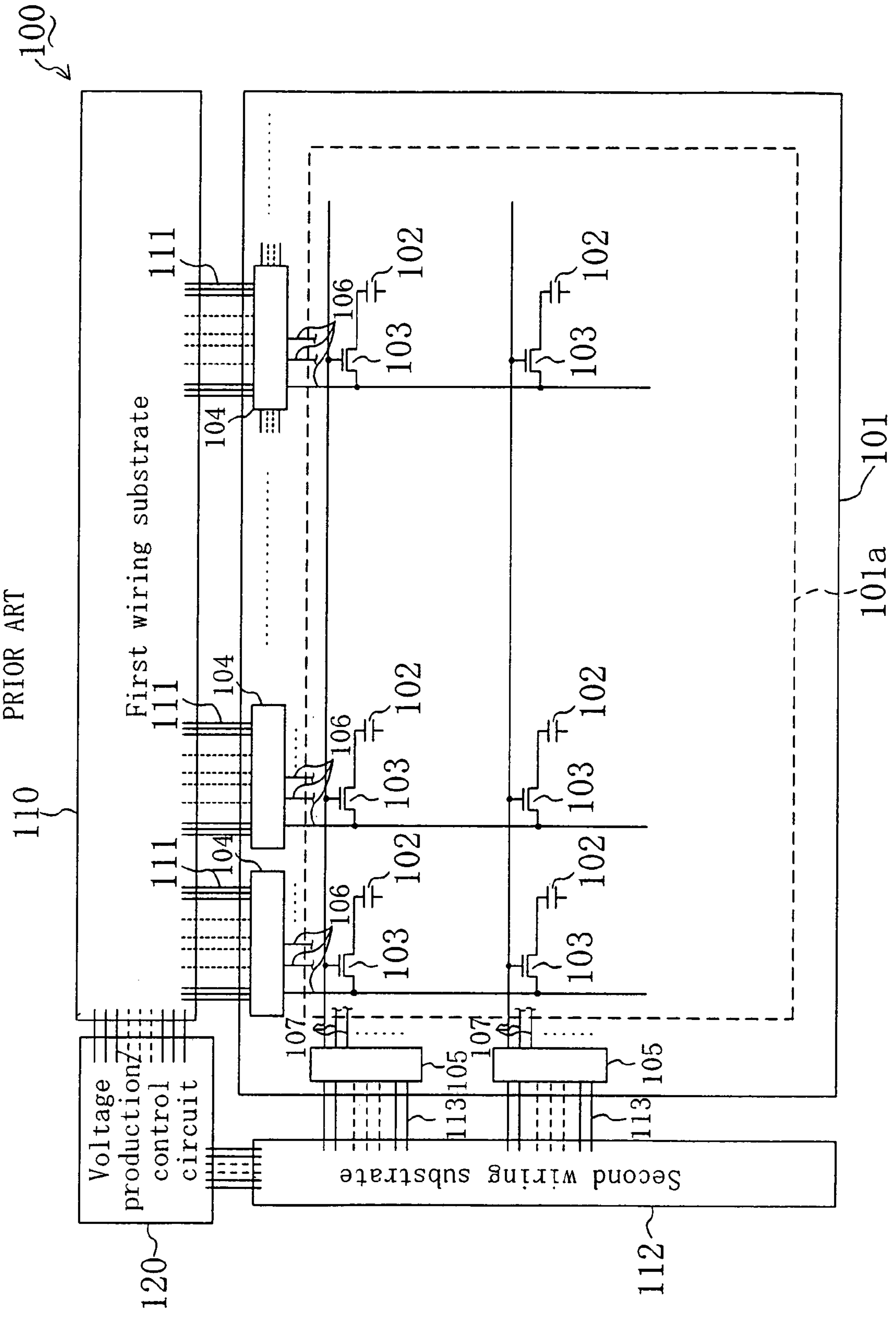
FIG. 9 PRIOR ART
FIG. 9 is a plan view of a conventional liquid crystal module.
Figure 10:
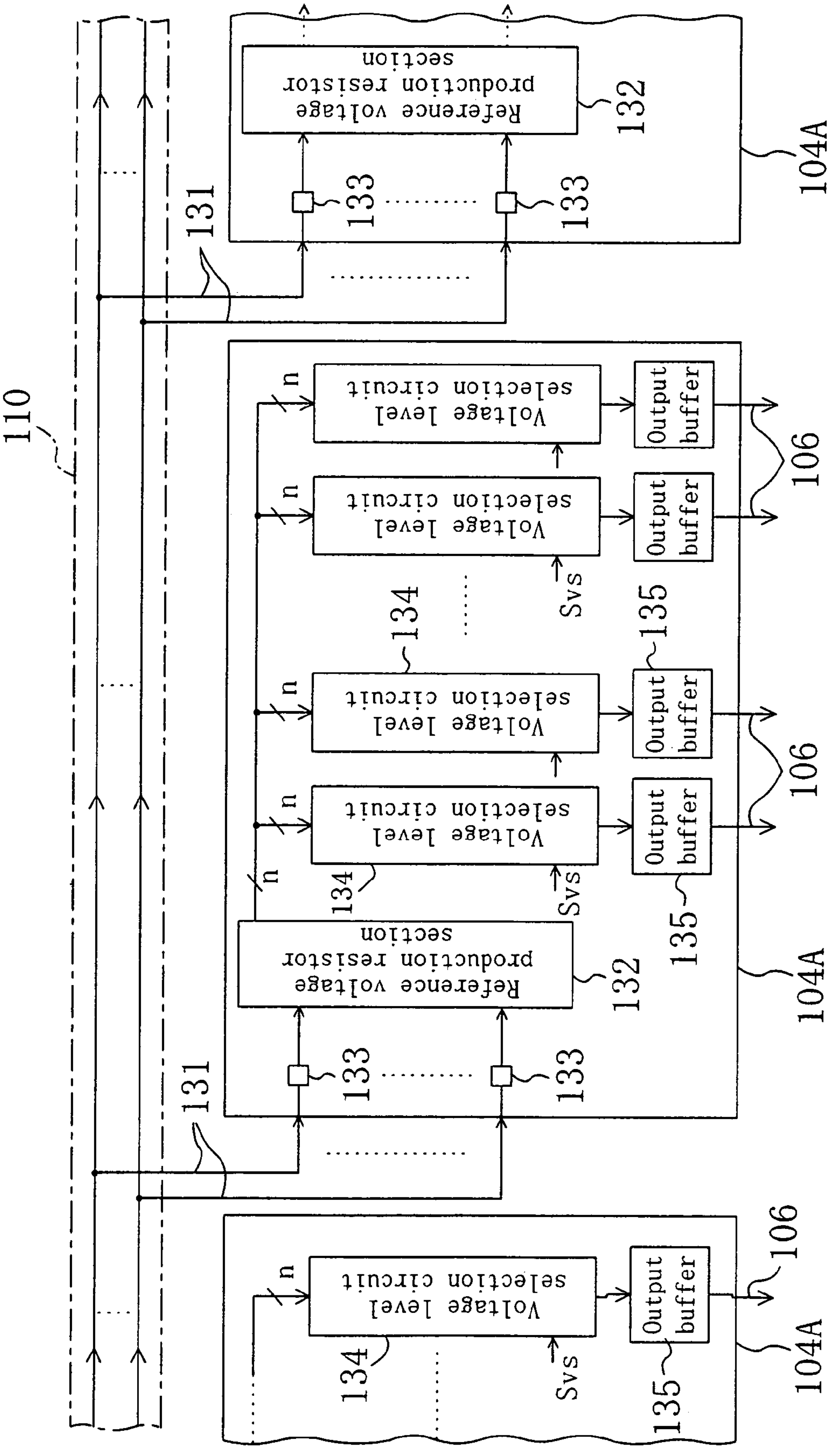
FIG. 10 PRIOR ART
FIG. 10 is a block circuit diagram schematically illustrating the structure of a conventional source driver of the first type.
Figure 11:
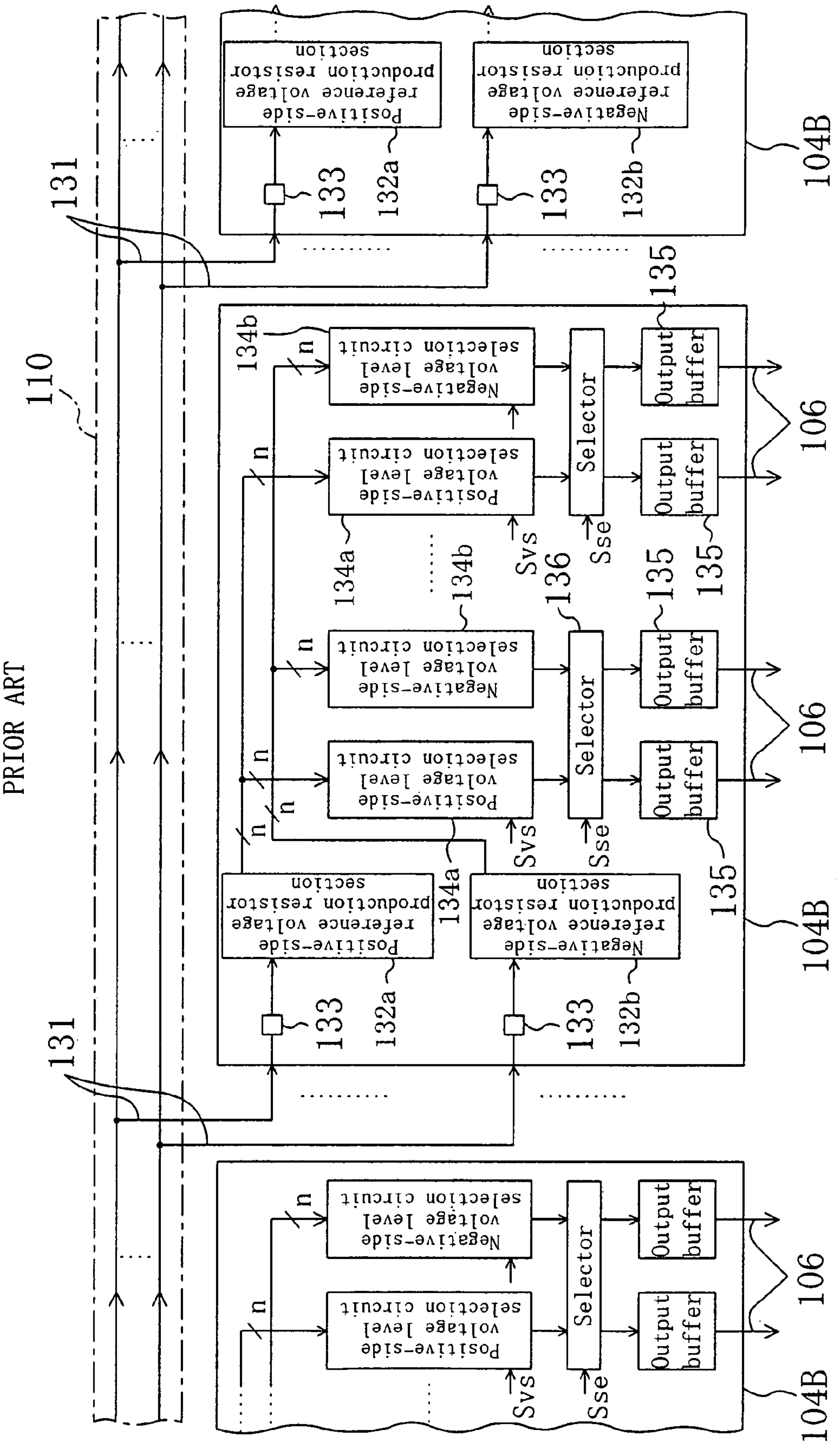
FIG. 11 PRIOR ART
FIG. 11 is a block circuit diagram schematically illustrating the structure of a conventional source driver of the second type.

In the conventional liquid crystal module 100 illustrated in FIG. 9, a large number of wires, including the reference voltage wires, are carried on the first wiring substrate 110, and the reference voltages are supplied to the source drivers 104 via the flexible wires 111. In contrast, in the liquid crystal module 90 of the present embodiment illustrated in FIG. 1 to FIG. 3, the reference voltages are supplied from the voltage production/control circuit 20 to the source drivers 4 via the reference voltage wires 15, 16 and 17. Therefore, wires for supplying the reference voltages do not need to be carried on the first wiring substrate 10, thereby accordingly simplifying the structure of the first wiring substrate 10. Thus, it is possible to realize a reduction in the size and the total cost of the liquid crystal module 90 by simplifying the structure of the first wiring substrate, which in the prior art is obtained by stacking together a large number of substrates.

As described above, the resistance value of the reference voltage wires 131 in the first wiring substrate 110 in the conventional liquid crystal module 100 is on the order of 1, whereas the resistance value of the reference voltage wires 15, the in-chip reference voltage wires 17 and the inter-chip reference voltage wires 16 in the liquid crystal module 90 of the present embodiment ranges from values on the order of 1 to values on the order of 100. Therefore, greater voltage drops are more likely to occur in the reference voltages to be received by those source drivers 4 that are further away from the voltage production/control circuit 20.

In view of this, in the present embodiment, the reference voltage production buffer 31 is provided immediately before the reference voltage production resistor section 32 of each source driver 4, so that there is no current that flows into/out of a reference voltage production resistor via a reference voltage wire, thereby suppressing a voltage drop even when the resistances of the reference voltage wires 15, 16, 17 and 17*a* are on the order of 100.

Furthermore, measures for reducing as much as possible the difference between the input voltage and the output voltage (the offset voltage) of the reference voltage production buffer 31 are also taken. This will be described below.

Figure 4A:
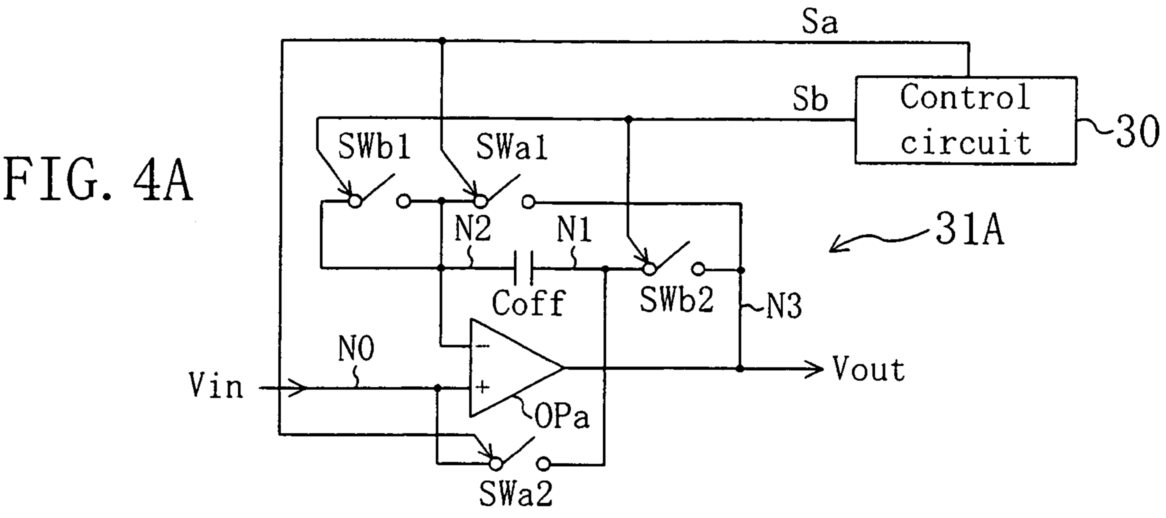
FIG. 4(*a*), FIG. 4(*b*) and FIG. 4(*c*) are electric circuit diagrams illustrating the structure of a reference voltage production buffer having an offset canceling function, and a switch opening/closing control therefor, according to the first embodiment.
Figure 4B:
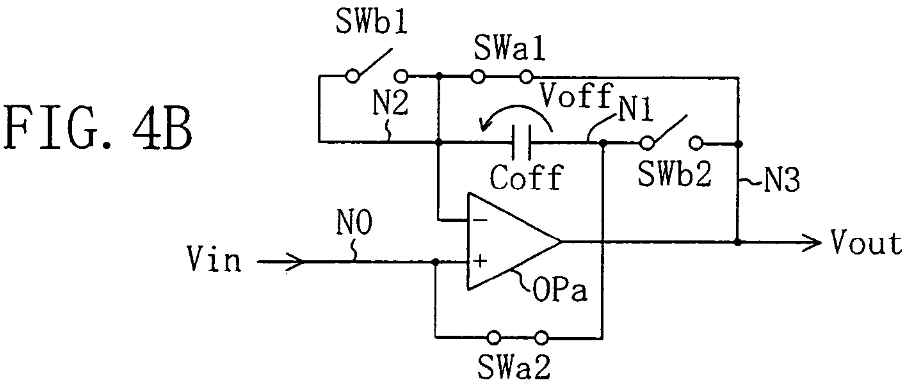
Figure 4C:
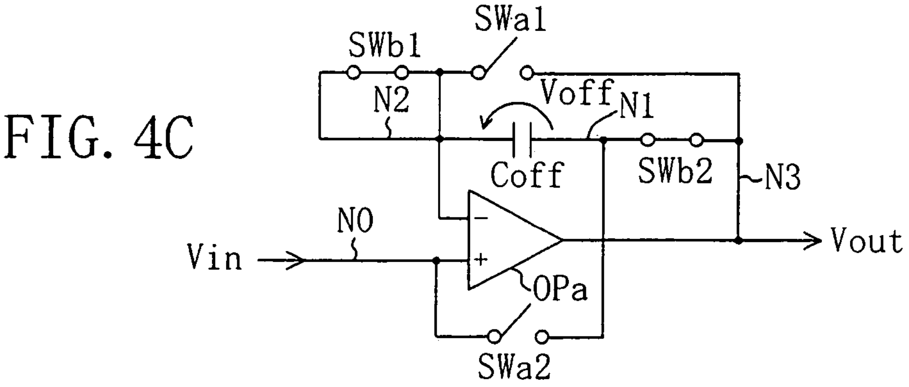

FIG. 4(*a*), FIG. 4(*b*) and FIG. 4(*c*) are electric circuit diagrams illustrating the structure of a reference voltage production buffer 31A having an offset canceling function, and a switch opening/closing control therefor, according to the present embodiment.

As illustrated in FIG. 4(*a*), the reference voltage production buffer 31A includes an operational amplifier OPa, a capacitor Coff, and four switches SWa1, SWa2, SWb1 and SWb2. A non-inverted input terminal of the operational amplifier OPa is connected to the branch reference voltage wire 17*a*, which is an input-side signal line, via the input-side node N0. An inverted input terminal of the operational amplifier OPa is connected to one electrode of the capacitor Coff via a node N2. Moreover, the other electrode of the capacitor Coff is connected to a node N1, and the switch Sa2 is provided between the node N1 and the node N0. A closed circuit including the switch SWb1 therein is added to the node N2. An output-side terminal of the operational amplifier OPa is connected to a node N3, while the switch SWa1 is provided between the node N3 and the node N2 and the switch Swb2 is provided between the node N3 and the node N1. The switches SWa1 and SWa2 are opened/closed by a control signal Sa output from the control circuit 30, and the switches SWb1 and SWb2 are opened/closed by a control signal Sb (a control signal that is different from the control signal Sa) output from the control circuit 30. Normally, the switches SWa1, SWa2, SWb1 and SWb2 are each made of a MOS transistor. The switch Swb1 is an operation compensation switch whose ON/OFF operation is inverted from that of the switch SWa1 so as to cancel the parasitic capacitance of the switch SWa1.

In the reference voltage production buffer 31A, no current will flow from the input-side node N0 into the node N3 because of the presence of the operational amplifier OPa therebetween. Moreover, while a common operational amplifier functions as a differential amplifier for amplifying the difference between voltages received respectively from the two input terminals, the operational amplifier OPa in the present embodiment has a negative feedback type structure that provides a feedback by using one of the output voltages as an input voltage. The operational amplifier OPa having such a structure operates so that an output voltage Vout is equal to an input voltage Vin. However, with only the operational amplifier OPa being provided, a certain degree of potential difference, i.e., an offset voltage Voff, occurs between the input-side node N0 and the output-side node N3. In view of this, the capacitor Coff is provided so as to cancel the offset voltage Voff.

The operation of the reference voltage production buffer 31A will be described with reference to FIG. 4(*b*) and FIG. 4(*c*). First, as illustrated in FIG. 4(*b*), the switches Swa1 and SWa2 are closed (turned ON) and the switches SWb1 and SWb2 are opened (turned OFF). At this time, the voltage at the node N1 equals the voltage value of the input voltage Vin, and the voltage at the node N2 equals a voltage value (Vin+Voff) obtained by adding the voltage value of the input voltage Vin to the offset voltage Voff of the operational amplifier OPa. Therefore, a charge corresponding to the offset voltage Voff of the operational amplifier OPa is stored in the capacitor Coff.

Then, as illustrated in FIG. 4(*c*), the switches SWa1 and Swa2 are opened (turned OFF) and the switches SWb1 and SWb2 are closed (turned ON) so that the charge having been stored in the capacitor Coff is not discharged. Then, a voltage obtained by canceling the offset voltage Voff is output as the output voltage Vout. In this way, it is possible to output a voltage that is generally equal to the voltage value of the input voltage Vin. Thereafter, the connection as illustrated in FIG. 4(*b*) and the connection as illustrated in FIG. 4(*c*) are alternately switched to one another at regular time intervals (the interval is not necessarily one clock cycle) so as to effect the offset canceling function.

By providing the reference voltage production buffer 31A with the offset canceling function as described above added thereto, it is possible to supply a high-precision voltage value, as a reference voltage before subdivision, from the reference voltage wire 17 to the reference voltage production resistor section 32, and thus to suppress the variations in the control voltage values to be applied to the liquid crystal elements 2.

Second Embodiment

In the reference voltage production buffer 31A of the first embodiment having the offset canceling function as illustrated in FIG. 4(*a*), a reference voltage value supplied from a reference voltage wire is offset to the voltage at the node N3 being (Vin+Voff), and this offset reference voltage is output in the state illustrated in FIG. 4(*b*). However, it is necessary to keep the state of FIG. 4(*b*) until the capacitor Coff is charged with the offset voltage Voff. As this time period increases, the time period during which the offset-canceled voltage value is supplied to the reference voltage production resistor section 32 as a reference voltage is shortened. Therefore, it may not be possible to address lower voltages and higher definitions that may be achieved in the future.

In view of this, an example where a reference voltage production buffer capable of more reliably realizing the offset cancellation is provided will be described in the present embodiment. The present embodiment employs the basic structures of the liquid crystal module 90, the source drivers 4 and the reference voltage production resistor section 32 as those in the first embodiment (see FIG. 1 to FIG. 3).

Figure 5:
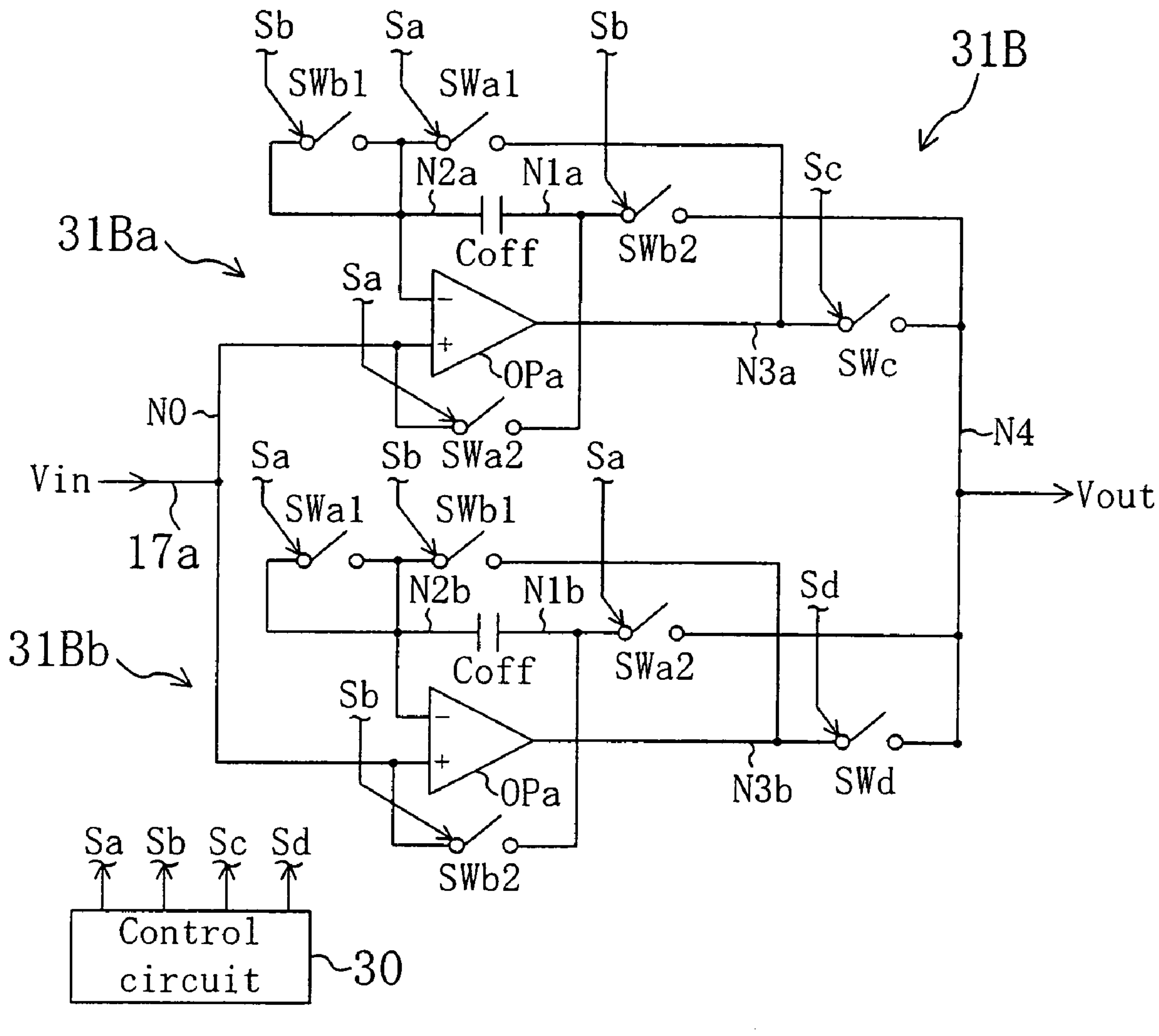
FIG. 5 is an electric circuit diagram illustrating the structure of a reference voltage production buffer of a second embodiment.

FIG. 5 is an electric circuit diagram illustrating the structure of a reference voltage production buffers 31B of the present embodiment. The reference voltage production buffers 31B of the present embodiment includes: a first buffering circuit 31Ba including the operational amplifier OPa, the capacitor Coff and five switches SWa1, SWa2, SWb1, SWb2 and SWc; and a second buffering circuit 31Bb including the operational amplifier OPa, the capacitor Coff and five switches SWa1, SWa2, SWb1, SWb2 and SWd. In the first buffering circuit 31Ba, the non-inverted input terminal of the operational amplifier OPa is connected to the branch reference voltage wire 17*a*, which is an input-side signal line, via the input-side node N0. The inverted input terminal of the operational amplifier OPa is connected to one of the electrodes of the capacitor Coff via a node N2*a*. Moreover, the other electrode of the capacitor Coff is connected to a node N1*a*, and the switch SWa2 is provided between the node N1*a* and the node N0. A closed circuit including the switch Swb1 therein is added to the node N2*a*. An output-side terminal of the operational amplifier OPa is connected to a node N3*a*, while the switch Swa1 is provided between the node N3*a* and the node N2*a*. Furthermore, the switch SWc is provided between an output-side node N4, which is to be a reference signal output section, and the node N3*a*, and the switch SWb2 is provided between the output-side node N4 and the node N1*a*. Moreover, the control circuit 30 outputs control signals Sa, Sb, Sc and Sd, which are different from one another.

The second buffering circuit 31Bb includes the switch SWd in place of the switch SWc in the first buffering circuit 31Ba, the switches SWb1 and SWb2 in place of the switches SWa1 and SWa2, the switches SWa1 and SWa2 in place of the switches SWb1 and SWb2, and nodes N1*b*, N2*b* and N3*b* in place of the nodes N1*a*, N2*a* and N3*a*, respectively. In the first buffering circuit 31Ba and the second buffering circuit 31Bb, the switches SWa1 and SWa2 are opened/closed by the control signal Sa output from the control circuit 30, the switches SWb1 and SWb2 are opened/closed by the control signal Sb output from the control circuit 30, the switch SWc is opened/closed by the control signal Sc output from the control circuit 30, and the switch SWd is opened/closed by the control signal Sd output from the control circuit 30. Thus, it can be considered that the first buffering circuit 31Ba and the second buffering circuit 31Bb have basically the same circuit structure, with only the opening/closing control of the switches SW being reversed.

In the first embodiment, as illustrated in FIG. 4(*a*), a common node (N3) is used in the reference voltage production buffer 31A as the node on the output side of the switch SWb2 and as the node on the output side of the switch SWa1. In contrast, in each of the buffering circuits 31Ba and 31Bb of the reference voltage production buffers 31B of the present embodiment illustrated in FIG. 5, the node on the output side of the switches SWb2 and SWa2 is connected directly to (forming a common node with) the output-side node N4 for outputting the output voltage Vout, while the nodes on the output side of the switches SWa1 and SWb1 are connected directly to (forming a common node with) the nodes N3*a* and N3*b* between the output side of the operational amplifier OPa and the switches SWc and SWd, respectively.

Figure 6A:
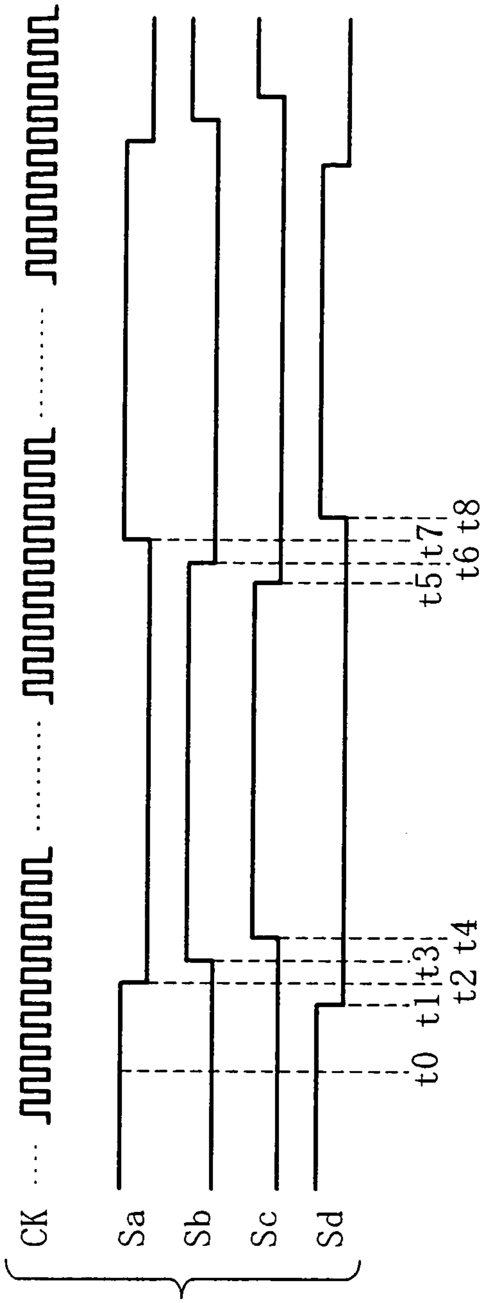
FIG. 6(*a*) and FIG. 6(*b*) are timing charts illustrating the procedure of controlling the opening/closing of each switch of the reference voltage production buffer of the second embodiment, and a variation thereof.
Figure 6B:
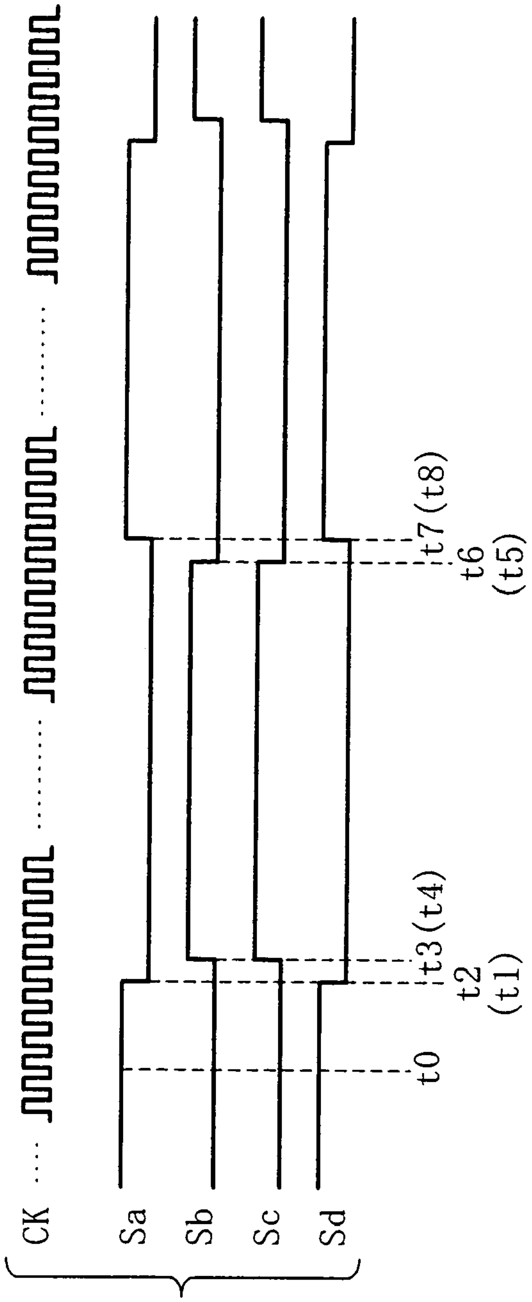

FIG. 6(*a*) is a timing chart illustrating the procedure of controlling the opening/closing of each switch of the reference voltage production buffers 31B of the present embodiment. First, at timing t0, the control signals Sa and Sd are at a high level and the control signals Sb and Sc are at a low level, thereby closing (turning ON) the switches SWa1, SWa2 and Swd while opening (turning OFF) the switches SWb1, SWb2 and SWc. Thus, the first buffering circuit 31Ba is cut off from the output-side node N4, and a reference voltage is output from the node N3*b* of the second buffering circuit 31Bb to the output-side node N4, which is the reference signal output section. At this time, the connection of the second buffering circuit 318*b* is substantially the same as that illustrated in FIG. 4(*c*), whereby an offset-canceled reference voltage is output from the output-side node N4, as already described above. On the other hand, the connection of the first buffering circuit 31Ba is substantially the same as that illustrated in FIG. 4(*b*), and the capacitor Coff is being charged with the offset voltage Voff.

Then, at timing t1, the state transitions to another with only the control signal Sd transitioning to the low level, thereby opening (turning OFF) the switch SWd. Then, at timing t2, the control signal Sa transitions to the low level, thereby opening (turning OFF) the switches SWa1 and SWa2, and thus cutting off the second buffering circuit 31Bb and the output-side node N4 from each other. On the other hand, the switches SWb2 and SWc of the first buffering circuit 31Ba remain open, whereby the first buffering circuit 31Ba and the output-side node N4 are also cut off from each other.

Then, at timing t3, the control signal Sb transitions to the high level, thereby closing (turning ON) the switches SWb1 and Swb2, and at timing t4, the control signal Sc transitions to the high level, thereby closing (turning ON) the switch SWc. Thus, the first buffering circuit 31Ba is turned into the state illustrated in FIG. 4(*c*), thereby outputting an offset-canceled reference voltage to the output-side node N4. In the second buffering circuit 31Bb, on the other hand, the switches SWb1 and SWb2 are closed so that the capacitor Coff transitions to a charging state, but the second buffering circuit 31Bb is cut off from the output-side node N4 since the switches SWa2 and Swd are open.

Therefore, through timings t1 to t4, an output voltage (Vin+Voff) including the offset voltage Voff is not output, as the output voltage Vout, to the reference voltage production resistor section 32, whereby it is possible to supply only offset-canceled reference voltages except for a time period of several clock cycles.

Then, through timings t5 to t7, the switches SW are opened/closed in the reverse order from that through timings t1 to t4 as described above. Specifically, after the first buffering circuit 31Ba and the second buffering circuit 31Bb are cut off from the output-side node N4, the first buffering circuit 31Ba is switched to a charging state, and then switching is done so as to output an offset-canceled reference voltage from the second buffering circuit 31Bb to the output-side node N4.

On the other hand, between timings t2 and t3 and between timings t6 and t7, a produced signal is not output from either one of the buffering circuits 31Ba and 31Bb of the reference voltage production buffers 31B. However, each of these inactive periods is only about several clock cycles.

In the present embodiment, the offset canceling function can be obtained more reliably in addition to the effect of the first embodiment described above. Specifically, with a single buffering circuit having the offset canceling function, it is required, due to its structure, that an output voltage including an offset voltage is output, or otherwise the output is stopped, during the charging period for realizing the offset cancellation. Therefore, the inactive period during which no reference voltage is output may be long.

In contrast, in the present embodiment, while one production circuit 31Ba (or 31Bb) is being charged, the other production circuit 31Bb (or 31Ba) can be operated to output an offset-canceled reference voltage, whereby it is possible to output only offset-canceled reference voltages while suppressing the inactive period to a length of about several clock cycles.

FIG. 6(*b*) is a timing chart according to a variation of the present embodiment, in which timings t1 and t2 are aligned with each other while timings t3 and t4 are aligned with each other. This variation is advantageous in that effects as those of the present embodiment can be provided, while the amount of time required for switching the first buffering circuit 31*a* and the second buffering circuit 31*b* between the charging state and the output state can be shortened from that of the timing chart illustrated in FIG. 6(*a*).

Third Embodiment

A liquid crystal module including source drivers of the second type will be described in the present embodiment.

Figure 7:
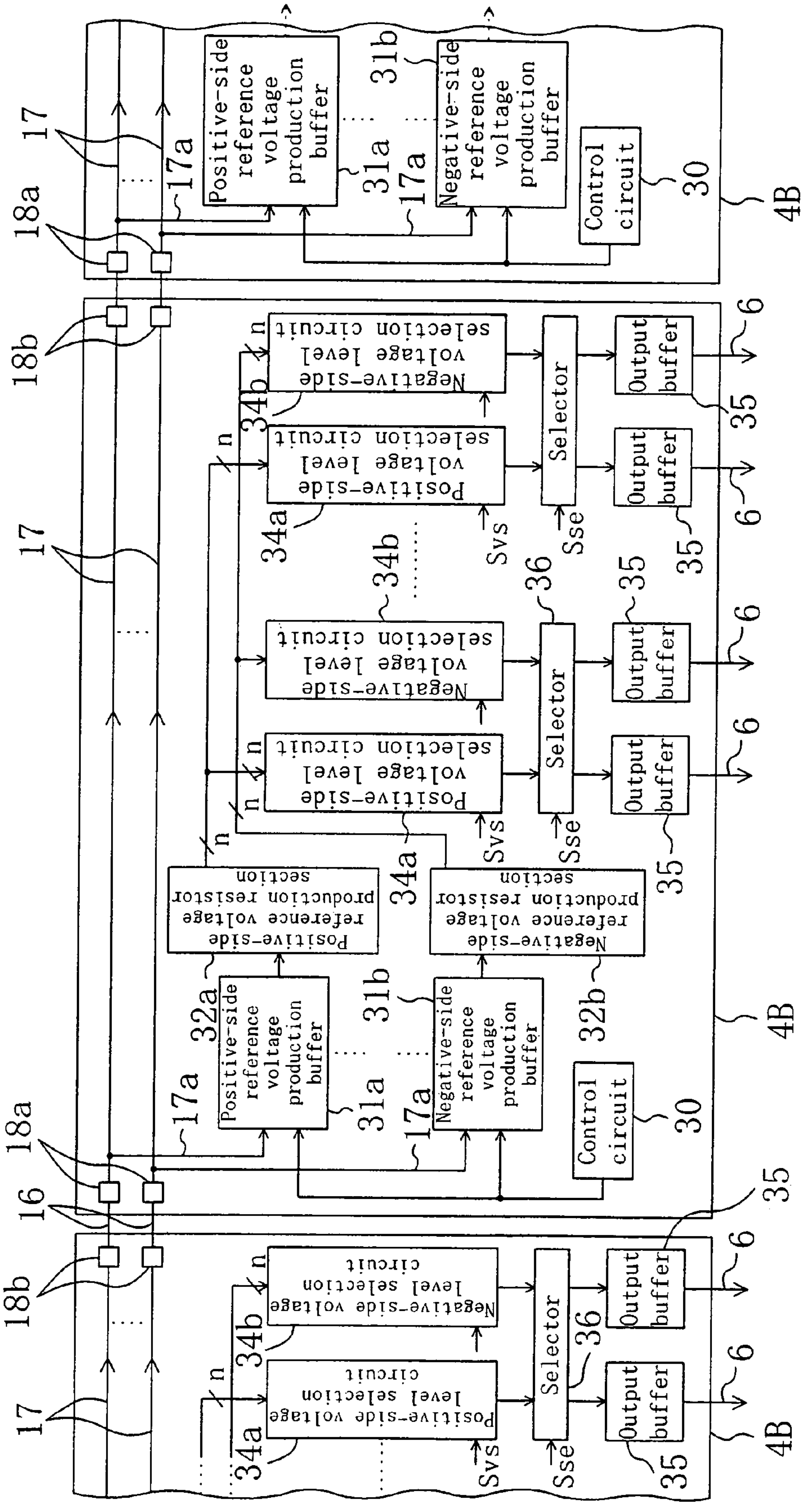
FIG. 7 is a block circuit diagram schematically illustrating the structure of a source driver of a second type according to a third embodiment.

FIG. 7 is a block circuit diagram schematically illustrating the structure of a source driver 4B of the second type according to the present embodiment. As illustrated in the figure, the source driver 4B includes therein: a positive-side reference voltage production resistor section 32*a* for receiving a reference voltage whose potential is higher than that of the intermediate voltage applied to the counter transparent electrode; and a negative-side reference voltage production resistor section 32*b* for receiving a reference voltage whose potential is lower than that of the intermediate voltage applied to the counter transparent electrode. Each voltage level selection circuit 34 can be divided into a positive-side voltage level selection circuit 34*a* for receiving the output from the positive-side reference voltage production resistor section 32*a*, and a negative-side voltage level selection circuit 34*b* for receiving the output from the negative-side reference voltage production resistor section 32*b*. The positive-side voltage level selection circuits 34*a* and the negative-side voltage level selection circuits 34*b* are arranged alternately. The output from the positive-side voltage level selection circuits 34*a* and the output from the negative-side voltage level selection circuits 34*b* are alternately switched to one another so as to be supplied to the output buffers 35, 35 provided on the output side thereof, by the selector 36 receiving the outputs from the positive-side voltage level selection circuit 34*a* and the negative-side voltage level selection circuit 34*b* according to the selector control signal Sse. Thus, voltage signals that are alternately switched between the high level and the low level at regular time intervals are output from the two output buffers 35, 35 adjacent to each other. Specifically, voltages of the opposite polarities are always applied across the liquid crystal elements 2 connected to the adjacent data lines 6, with the polarities being inverted at regular time intervals. Thus, the source driver 4B provided in a liquid crystal module of the second type switches the voltages of the adjacent data lines 6 between the high level and the low level so that the voltage applied across each liquid crystal element 2 is switched between a positive value and a negative value at regular time intervals.

Figure 8:
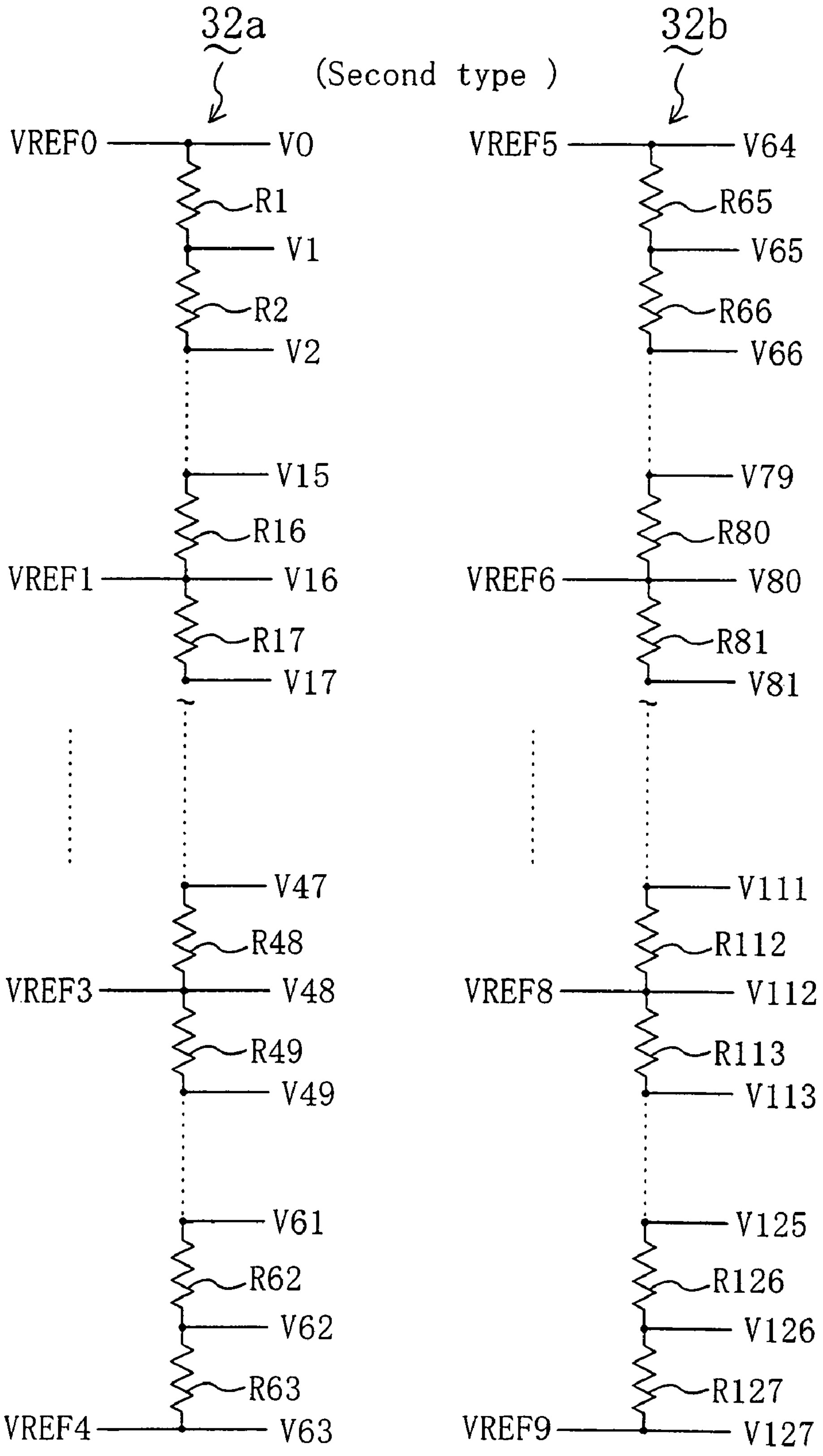
FIG. 8 is a circuit diagram illustrating the structure of a positive-side reference voltage production resistor section and that of a negative-side reference voltage production resistor section according to the third embodiment.

Moreover, FIG. 8 is a circuit diagram illustrating the structure of the positive-side reference voltage production resistor section 32*a* and that of the negative-side reference voltage production resistor section 32*b* of the present embodiment. As illustrated in the figure, the positive-side reference voltage production resistor section 32*a* includes (n−1) (63 in this example) resistors R1 to R63 connected together in series. It is designed so as to receive reference voltages VREF0 to VREF4, subdivided in five steps, from the respective branch reference voltage wires 17*a*, and then output voltage signals V0 to V63, subdivided in 64 steps, from the nodes between the resistors R1 to R63. The negative-side reference voltage production resistor section 32*b* includes (n−1) (63 in this example) resistors R65 to R127 connected together in series. It is designed so as to receive reference voltages VREF5 to VREF9, subdivided in five steps, from the respective branch reference voltage wires 17*a*, and then output voltage signals V65 to V127, subdivided in 64 steps, from the nodes between the resistors R65 to R127.

In the present embodiment, either the first embodiment or the second embodiment may be employed for the structure of the reference voltage production buffers 31. Also in the liquid crystal module of the present embodiment, as in the first embodiment, reference voltages are supplied from the voltage production/control circuit 20 to the source drivers 4 via the reference voltage wires 15, 16, 17 and 17*a*. Therefore, the wires for supplying reference voltages do not need to be carried on the first wiring substrate 10, whereby it is possible to accordingly simplify the structure of the first wiring substrate 10. Thus, it is possible to realize a reduction in the size and the total cost of the liquid crystal module by simplifying the structure of the second wiring substrate, which in the prior art is obtained by stacking together a large number of substrates.

Moreover, it is possible to suppress the variations in the voltage value to be applied across each liquid crystal element 2 due to a voltage drop, by arranging the reference voltage production buffer 31A (or 31B) as illustrated in FIG. 4(*a*) or FIG. 5 immediately before the positive- or negative-side reference voltage production resistor section 32*a* or 32*b*.

According to the present invention, reference voltage wires are provided for connecting semiconductor integrated circuit devices functioning as source drivers in series with one another on the liquid crystal panel, thus taking measures for avoiding a voltage drop in the reference voltage in the source drivers. Therefore, it is possible to provide a liquid crystal driving circuit, a semiconductor integrated circuit device, a reference voltage buffering circuit, and a method for controlling the same, that are suitable for use in a liquid crystal module having a reduced size and a reduced total cost.

INDUSTRIAL APPLICABILITY

The liquid crystal driving circuit, the semiconductor integrated circuit device, the reference voltage buffering circuit, and the method for controlling the same, of the present invention can be used in display devices of various types of electric equipment such as personal computers, television sets, VCRs and video game machines.

The invention claimed is:

1. A display panel comprising:

a plurality of display elements arranged in a matrix pattern;

a plurality of drivers each for driving a display element of the plurality of display elements, each of the plurality of drivers including:

a plurality of input-side pads, each input-side pad receiving a reference voltage;

a plurality of output-side pads, each output-side pad outputting the reference voltage;

a plurality of in-chip reference voltage wires, each in-chip reference voltage wire directly connecting each input-side pad to each output-side pad to transmit the reference voltage;

a plurality of branch reference voltage wires, each branch reference voltage wire branching off from each in-chip reference voltage wire and transmitting the reference voltage in parallel with each in-chip reference voltage wire;

a plurality of buffers, each buffer coupled to each branch reference voltage wire and outputting an output voltage in response to the reference voltage transmitted by each branch reference voltage wire; and a selection circuit selecting a voltage for driving the display element in response to output voltages of the plurality of buffers, a plurality of inter-chip reference voltage wire units, each inter-chip reference voltage wire unit interposed between any two adjacent drivers of the plurality of drivers and including a plurality of inter-chip reference voltage wires, each inter-chip reference voltage wire connecting each output-side pad of one driver of the two adjacent drivers to each input-side pad of the other driver of the two adjacent drivers;

a reference voltage production circuit capable of producing a plurality of reference voltages to drive the plurality of drivers; and a reference voltage providing wire unit capable of receiving the plurality of reference voltages and providing the plurality of reference voltages to one of the plurality of drivers and including a plurality of reference voltage providing wires, each reference voltage providing wire coupled to each in-chip reference voltage wire via each input-side pad of the one of the plurality of drivers to provide a reference voltage.

2. The display panel of claim 1, each driver of the plurality of drivers further comprising a subdivided voltage production circuit, the subdivided voltage production circuit receiving the output voltages of the plurality of buffers and capable of producing subdivided voltages in response to the output voltages of the plurality of buffers and outputting the subdivided voltages to the selection circuit, wherein the selection circuit selects one of the subdivided voltages as the voltage for driving the liquid crystal element.

3. The display panel of claim 1, wherein the plurality of buffers include a first buffer receiving a positive-side reference voltage having a higher voltage than a predetermined voltage and a second buffer receiving a negative-side reference voltage having a lower voltage than the predetermined voltage, each driver of the plurality of drivers further includes:

a positive-side voltage production circuit receiving an output voltage of the first buffer so as to produce positive subdivided voltages and outputting the positive subdivided voltages to the selection circuit; and a negative-side voltage production circuit receiving an output voltage of the second buffer so as to produce negative subdivided voltages and outputting the negative subdivided voltages to the selection circuit, and the selection circuit of each driver selects a positive output and a negative output from the positive subdivided voltages and the negative subdivided voltages such that any two adjacent wires each coupled to a display element alternately receive the positive output and the negative output at regular time intervals.

4. The display panel of claim 1, wherein each buffer of the plurality of buffers of each driver of the plurality of drivers has an offset canceling function capable of reducing a potential difference between an input voltage and an output voltage.

5. The display panel of claim 4, wherein each buffer of the plurality of buffers of each driver of the plurality of drivers includes:

an operator capable of receiving an input voltage of the buffer at one terminal and an output voltage of the operator at the other terminal, so as to operate such that the output voltage is substantially equal to the input voltage;

a capacitor including a first electrode and a second electrode and capable of storing a charge corresponding to a voltage difference between the input voltage and the output voltage;

a first node connected to the first electrode of the capacitor;

a second node connected to the second electrode of the capacitor;

a third node for receiving the output voltage from the operator;

a first switching element provided between the second node and the third node;

a second switching element provided between the first node and the one terminal of the operator;

a third switching element provided between the first node and the third node.

6. The display panel of claim 5, each buffer of the plurality of buffers of each driver of the plurality of drivers further comprising a closed circuit added to the second node, the closed circuit including therein a fourth switching element for compensating an electric change in the second node due to the switching of the first switching element.

7. The display panel of claim 4, wherein each buffer of the plurality of buffers of each driver of the plurality of drivers includes two buffering circuits arranged in parallel to each another between an input-side node for receiving an input voltage of each buffer of the plurality of buffers and an output-side node for sending an output voltage of each buffer of the plurality of buffers, each buffering circuit of the two buffering circuits including:

an operator capable of receiving the input voltage of the buffer at one terminal via the input-side node and an output voltage of the operator at the other terminal, so as to operate such that the output voltage of the operator is substantially equal to the input voltage;

a capacitor including a first electrode and a second electrode and capable of storing a charge corresponding to a voltage difference between the input voltage and the output voltage of the operator;

a first node connected to the first electrode of the capacitor;

a second node connected to the second electrode of the capacitor;

a third node for receiving an output voltage from the operator;

a first switching element provided between the second node and the third node;

a second switching element provided between the first node and the input-side node of the operator;

a third switching element provided between the first node and the output-side node; and a fourth switching element provided between the third node and the output-side node.

8. The display panel of claim 7, each buffering circuit of the two buffering circuits further comprising a closed circuit added to the second node, the closed circuit including therein a fifth switching element for compensating an electric change in the second node due to switching of the first switching element.

* * * * *